(12) United States Patent
Smets et al.

(10) Patent No.: US 7,299,974 B2
(45) Date of Patent: Nov. 27, 2007

(54) SYSTEM AND METHOD FOR GENERATING COLLISION-FREE IDENTIFIERS FOR FINANCIAL TRANSACTION CARDS

(75) Inventors: Patrik Smets, Nijlen (BE); Paul Vanneste, Ottignies (BE)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 11/042,906

(22) Filed: Jan. 24, 2005

(65) Prior Publication Data

US 2005/0242171 A1 Nov. 3, 2005

Related U.S. Application Data

(60) Provisional application No. 60/538,769, filed on Jan. 23, 2004.

(51) Int. Cl.
*G06F 17/00* (2006.01)
(52) U.S. Cl. .................................................. 235/375
(58) Field of Classification Search ............. 235/375
See application file for complete search history.

(56) References Cited

U.S. PATENT DOCUMENTS

| | | | | |
|---|---|---|---|---|
| 5,867,577 A * | 2/1999 | Patarin | ........................ | 705/67 |
| 6,226,743 B1 * | 5/2001 | Naor et al. | ................. | 713/177 |
| 6,311,167 B1 * | 10/2001 | Davis et al. | .................. | 705/35 |
| 2003/0130955 A1 * | 7/2003 | Hawthorne | .................. | 705/65 |

* cited by examiner

*Primary Examiner*—Michael G. Lee
*Assistant Examiner*—Tae W. Kim
(74) *Attorney, Agent, or Firm*—Baker Botts LLP; Manu J. Tejwani

(57) ABSTRACT

A one-way permutation over financial transaction card data provides a merchant with a unique card identifier for each financial transaction card that is used by a customer to purchase goods from a merchant. This card identifier, which is not the actual financial transaction card data, may then be permissibly stored by the merchant and used to uniquely identify the customer's financial transaction card, and may also be used to determine the frequency with which that customer makes purchases using that card.

22 Claims, 5 Drawing Sheets

SYSTEM AND METHOD FOR GENERATING COLLISION-FREE IDENTIFIERS FOR FINANCIAL TRANSACTION CARDS

PRIORITY APPLICATION

This application claims priority to a U.S. Provisional Application entitled "System and Method for Generating Collision-Free Identifiers for Payment Cards," Ser. No. 60/538,769, which was filed on Jan. 23, 2004, and is incorporated by reference.

FIELD OF THE INVENTION

The present invention relates generally to a method and system that enables merchants to track their customers' purchasing behaviors. More particularly, the present invention relates to a novel method and system that enables merchants to identify their customers by means of financial transaction card data, but that does not require the merchants to store actual financial transaction card data.

BACKGROUND OF THE INVENTION

Merchants find it useful to keep track of who their customers are, and how frequently their customers make purchases. Merchants regularly use this information to, for example, administer customer incentives programs, for marketing purposes, and to formulate advertising strategies.

For those customers that make purchases using a financial transaction card (e.g., a credit card, debit card, smart card, etc.), merchants potentially have available to them an easy way of obtaining both identifying and purchase frequency information. Every financial transaction card has stored on it data, such as the customer's personal account number (PAN), which is unique to a particular customer. Such financial transaction card data is extracted from the card and sent to the merchant during the course of a typical card-based transaction. Merchants could store that unique financial transaction card data, and use it to determine each time a purchase was made by a customer using a particular financial transaction card.

However, merchants are currently unable to make use of financial transaction card data to keep track of customers and purchase frequency. For security reasons, current payment schemes for financial transaction cards have dictated rules that forbid merchants from storing financial transaction card data that contains information about a customer's account. There remains a need in the art for a simple method and system that would allow merchants to uniquely identify their customers using financial transaction card data, but that does not require that the merchants store that data.

SUMMARY OF THE INVENTION

In accordance with an exemplary embodiment of the present invention, a one-way permutation over financial transaction card data provides a merchant with a unique card identifier for each financial transaction card that is used by a customer to purchase goods from a merchant. This card identifier, which is not the actual financial transaction card data, may then be permissibly stored by the merchant and used to uniquely identify the customer's financial transaction card, and may also be used to determine the frequency with which that customer makes purchases using that card.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
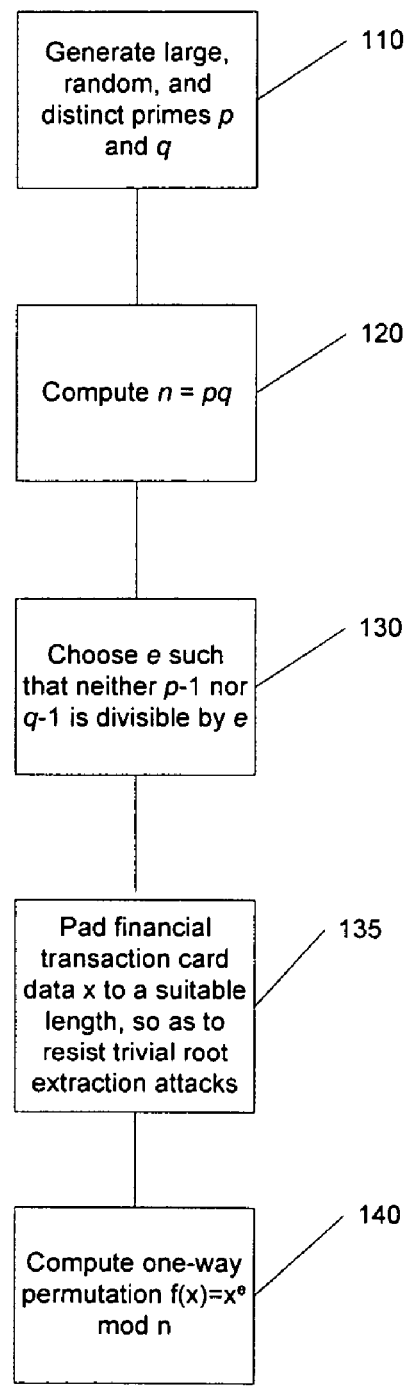
FIG. 1 is a flowchart depicting a suitable one-way permutation algorithm based on the factorization of large integers.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

The present invention calls for encrypting data stored on a customer's financial transaction card using a one-way permutation, and thus generating a value which may serve as a unique card identifier for each financial transaction card used. By using a one-way permutation over a customer's financial transaction card data, the present invention provides a card identifier that is not only secure and permissible for the merchant to store, but is also unique, i.e., may be associated with one, and only one, customer financial transaction card. By contrast, a one-way hash function would not guarantee the uniqueness of the card identifier. This is due to the occurrence of collisions, the likelihood of which could be unacceptably high were one-way functions to be used instead.

The problem of collisions in one-way functions is well-known in the art of cryptography. A one-way function is a function $f$ such that for each x in the domain of $f$, it is easy to compute $f(x)$, but for essentially all y in the range of $f$, it is computationally infeasible to find any x such that $y=f(x)$. Since, in a one-way function (i) the domain of inputs is typically large, and the inputs themselves of arbitrary finite lengths, (ii) the range of outputs is typically small, and the outputs themselves are of a fixed length, and (iii) every output is equally likely, it is probable that there exist two distinct input values x and x' that will produce the same output value. The occurrence of two distinct input values producing the same output to a one-way function is known as a collision.

The problem with collisions is that the more likely they are to occur, the more ineffective the one-way function is for guaranteeing that each card identifier will be unique, and that the encrypted financial transaction card data will remain secure. To avoid the likelihood of collisions, the present invention makes use of a one-way function that is also a permutation, i.e., a one-way permutation.

One-way permutations can be built on known hard problems. In accordance with an exemplary embodiment of the present invention, a suitable one-way permutation may be any permutation, built on a known hard problem (e.g., factorization of large integers, discrete logarithms in integer groups, etc.), the input of which is larger in size than the actual input data. In addition, a suitable one-way permutation may, for example, (i) have a level of security that is suitable in the context of the hard problem used, (ii) produced an output that may easily be stored, and (iv) be one that is easy to implement.

The level of security of the one-way permutation may be determined by comparing the known hard problem used with the modulus level employed. For example, if the one-way permutation is to be based on the hard problem of integer factorization, a 1024-bit modulus should provide a suitable security level.

Another factor is the size of the function output. For example, using a 1024-bit modulus in an integer factorization function will produce an output size of 1024 bits, or 128 bytes. This is a comparatively large piece of data, and is thus more difficult to store and transmit than, for example, the 20-byte output produced by elliptic curve cryptographic functions having a similar security level.

Ease of implementation, however, is also a factor. In the previous example, the elliptic curve function produces a smaller, and therefore more manageable output, but is harder to implement than the integer factorization function. The reason for this is that integer factorization functions, such as the modular exponentiation of integers, are already supported by certain smart card terminals, such as Europay-MasterCard-Visa (EMV) terminals.

In accordance with an exemplary embodiment of the present invention, one-way permutations that are suitable for generating unique, secure card identifiers include those that are based on the factorization of large integers, and on discrete logarithms in finite fields.

FIG. 1 is a flowchart depicting a suitable one-way permutation algorithm based on the factorization of large integers, in accordance with an exemplary embodiment of the present invention. First, at step 110, two large random and distinct primes p and q are generated. Next, at step 120, the product n of p and q is computed. Next, at step 130, e is chosen, such that neither p-1 nor q-1 are divisible by e. Next, at step 135, financial transaction card data x is properly padded to a suitable length so as to resist trivial root extraction attacks. Finally, at step 140, $f(x)=x^e \bmod n$ is computed for $x \in E \{0, \ldots, n-1\}$, where $f(x)$ is the one-way permutation of that financial transaction card data.

Figure 2:
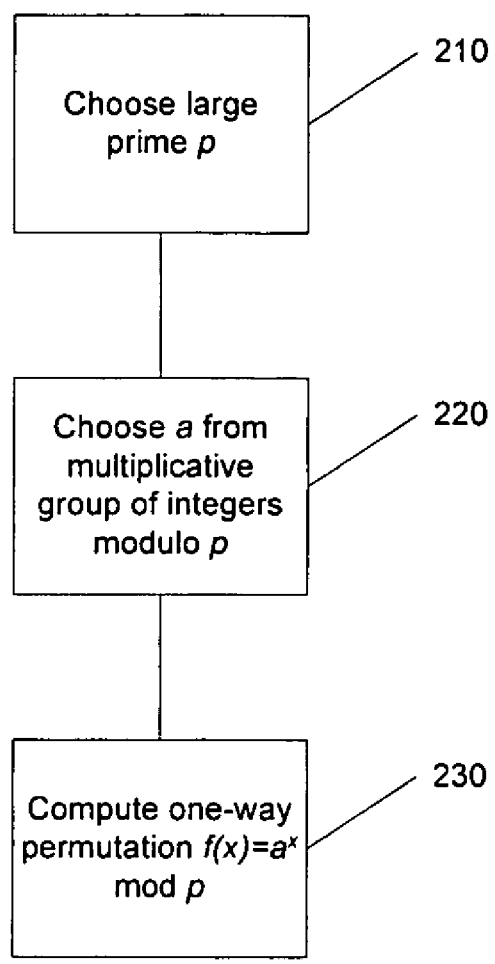
FIG. 2 is a flowchart depicting a suitable one-way permutation algorithm based on discrete logarithms in finite fields.

FIG. 2 is a flowchart depicting a suitable one-way permutation algorithm based on discrete logarithms in finite fields, in accordance with an exemplary embodiment of the present invention. First, at step 210, an appropriately large prime p is chosen. Next, at step 220, a is chosen from the multiplicative group of integers modulo p, i.e., $a \in Z_p^*$, to be a generator of $Z_p^*$. Finally, at step 230, $f(x)=a^x \bmod p$ is computed for $x \in E \{0, \ldots, p-1\}$, where x is the financial transaction card data that is input to the function and $f(x)$ is the one-way permutation of that financial transaction card data. Alternatively, instead of taking the discrete logarithm over $Z_p^*$, other groups where this problem is hard to solve may be used. This applies more specifically to elliptic curves over a finite field, where the discrete logarithm problem is known to be harder than in $Z_p^*$.

The financial transaction card data that is input into the one-way permutation algorithm described above may originate from either a magnetic stripe on the financial transaction card, or from a chip in a smart card. The financial transaction card data may be in a format that contains the PAN, expiry date, service codes, cardholder name, and issuer discretionary data (DD). In order for the card identifier to remain constant across all transactions for a given card, the input data to the one-way function must be carefully chosen. For example, the following considerations may apply to financial transaction card data stored on PayPass M/Stripe cards: (i) PayPass M/Stripe cards vary the Issuer DD at each transaction, so the Issuer DD should be excluded from the input to the one-way permutation; and (ii) the service codes differ between PayPass M/Stripe and magnetic stripe variants of the same card.

It is also important that the entropy of the financial transaction card data input into the one-way permutation be as large as possible. This is to avoid exhaustive attacks, as reduced entropy of the input data makes it easier for attackers to compute the function value for all possible inputs, effectively inverting the one-way permutation. Therefore, the following financial transaction card data may be used as input data to the one-way permutation:

Cardholder Name||PAN||Expiry date where || denotes concatenation.

This exemplary choice for the financial transaction card data input into the one-way permutation has the advantage of making the present invention effective for use with any financial transaction card whose financial transaction card number is assigned according to the ISO numbering rules. Those rules ensure that each financial transaction card is identified by unique card number. Thus, there should be no collision in the financial transaction card numbers input to the one-way permutation algorithm and, as a result, there should be no collisions in the one-way permutation's output, enabling the present invention to ensure that card identifiers are unique across the whole financial transaction card space.

Figure 3:
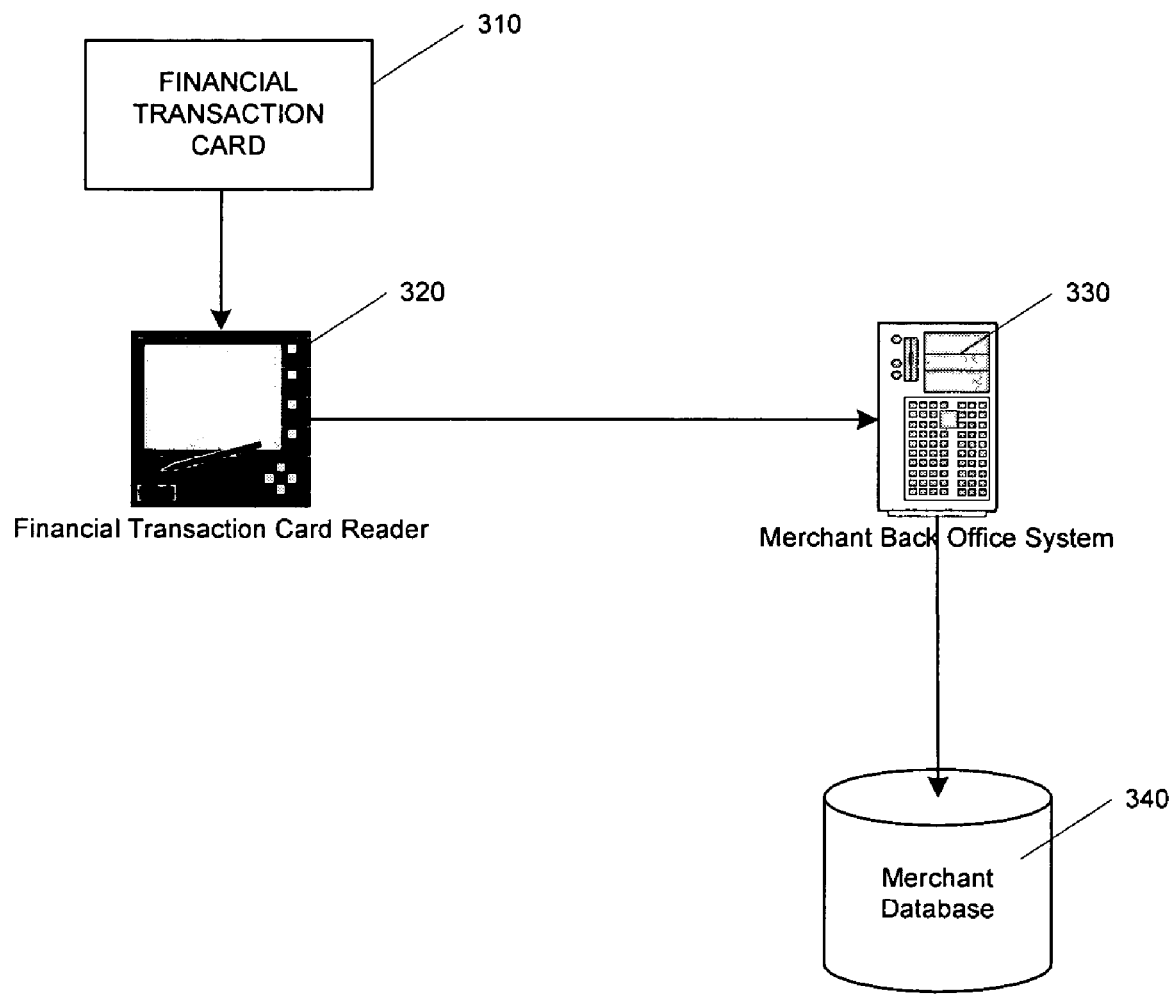
FIG. 3 is a block diagram depicting an exemplary system for generating and storing card identifiers.
Figure 4:
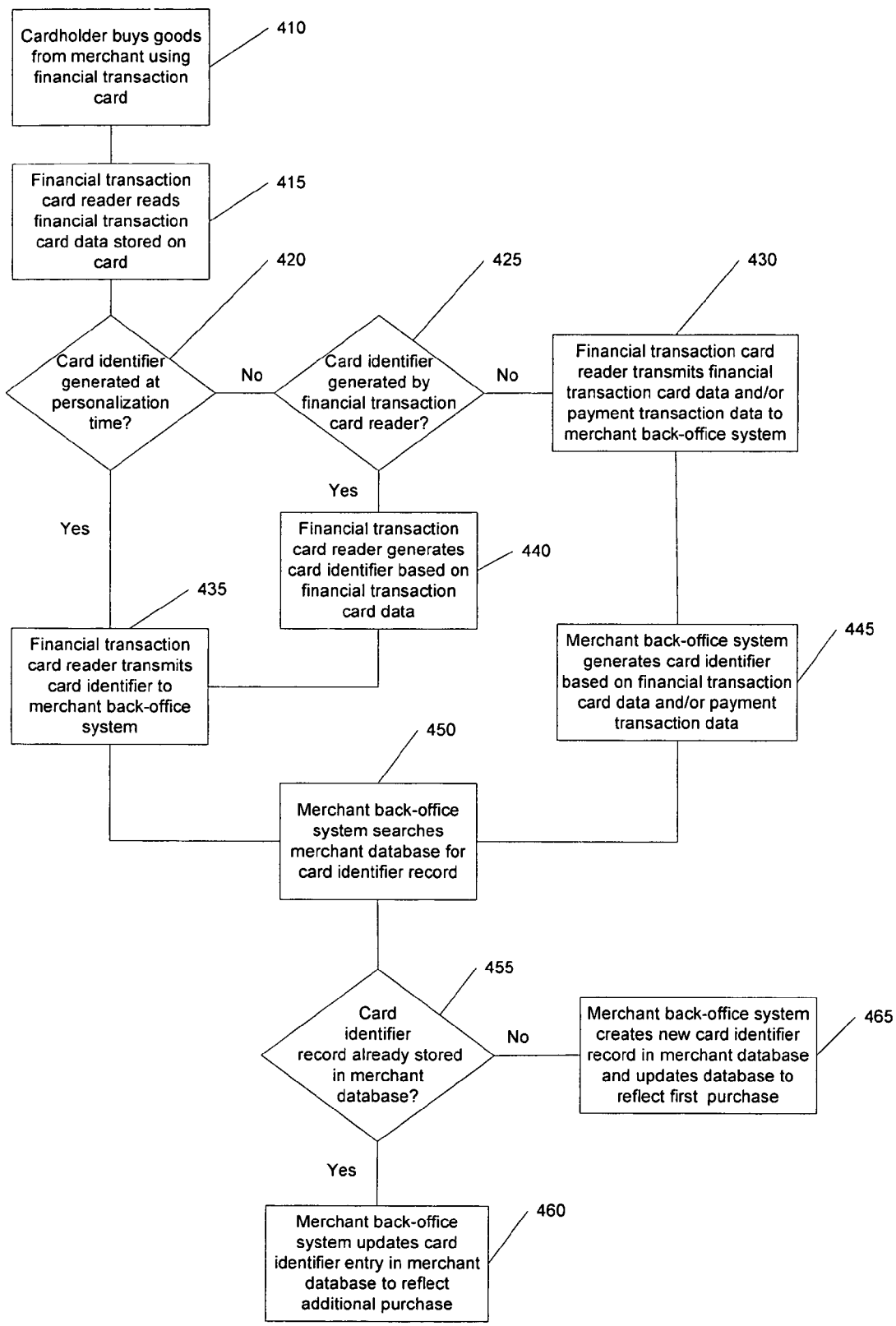
FIG. 4 is a flowchart depicting steps of an exemplary method for generating and storing card identifiers.

FIG. 3 is a block diagram depicting an exemplary system for generating and storing card identifiers, and FIG. 4 is a flowchart depicting steps of an exemplary method for generating and storing card identifiers. At step 410, a cardholder buys goods from a merchant using a financial transaction card 310. The financial transaction card 310 may be a debit card, credit card, or other financial transaction card 310, and may a conventional magnetic stripe card, or may be a smart card such as an M/Chip, or a PayPass M/Chip or M/Stripe card. At step 415, financial transaction card reader 320, which may be a magnetic stripe reader or a smart card reader, reads financial transaction card data stored on the financial transaction card 310.

At step 420, it is determined whether the card identifier was generated using the one-way permutation algorithm and stored on the financial transaction card 310 at card personalization time. If it was, then at step 435 the financial transaction card reader 320 transmits the card identifier to the merchant back-office system 330. An advantage to having the card identifier generated at card personalization time is that the uniqueness of the card identifier is enforced by the fact that it was generated using the one-way permutation algorithm. Thus, no management or control of card identifier assignment would be required at the payment scheme level, as it would if in the case of a conventional PAN assignment. In this scenario, responsibility for properly generating the card identifier, i.e., for ensuring that the card identifier is compliant with the payment scheme specifications, would fall on the issuer.

If the card identifier was not generated at personalization time, at step 430 it is determined whether the card identifier is to be generated by the financial transaction card reader 320. If so, then at step 440, the financial transaction card reader 320 uses the one-way permutation algorithm to generate the card identifier based on financial transaction card data. In this scenario, ensuring the proper generation of the card identifier by following the payment scheme specifications may be the responsibility of either the terminal manufacturer, or the acquirer. Where the financial transaction card 310 is a smart card such as, for example, an EMV smart card, and the financial transaction card reader 320 is an EMV smart card reader, generation of the card identifier using the financial transaction card reader 320 may be advantageous. EMV smart card readers are equipped with on-board RSA encryption functionality. In cases where the one-way permutation algorithm is based on the factorization of large integers (see FIG. 1 and accompanying discussion), an EMV smart card reader may easily generate a suitable identifier by RSA-encrypting financial transaction card data with the parameters e and n used as public exponent and public modulus respectively. Furthermore, EMV smart card readers already store appropriate values for n, which are the moduli of the payment system's public keys. Choosing one of these moduli as the modulus for the one-way permutation may make deployment even easier.

If at step 425 it is determined that the card identifier will not be generated by the financial transaction card reader 320, then at step 430, the financial transaction card reader 320 transmits financial transaction card data from an ad hoc swipe of the financial transaction card 310, or transmits financial transaction card data embedded in payment transaction data, to the merchant back-office system 330. The merchant back-office system 330 then at step 445 generates the card identifier based on the financial transaction card data. In this scenario, ensuring a proper generation of the card identifier by following the payment scheme specifications would be the responsibility of the merchant or the provider of the merchant's back-office system 330.

At step 450 the merchant back-office system 330 searches the merchant database 340 to determine whether a record for the card identifier already exists. If at step 455 it is determined that such a record already exists, then the merchant back-office system 330 updates the card identifier record in the merchant database 340 to reflect an additional purchase by the customer using the financial transaction card 310. If at step 455 it is determined that a record for the card identifier does not already exist in the merchant database 340, the merchant back-office system 330 creates a new card identifier record in the merchant database 340, and updates the merchant database 340 to reflect that a purchase was made using the financial transaction card 310.

In an alternative embodiment of the present invention, the cardholder name is also recorded in the merchant database 340. In this way, if a customer owns and uses several different financial transaction cards 310, the merchant will be able to keep track not just of how many purchases were made using a particular financial transaction card 310, but how many purchases were made by a person with a particular name using one or more financial transaction card 310.

Figure 5:
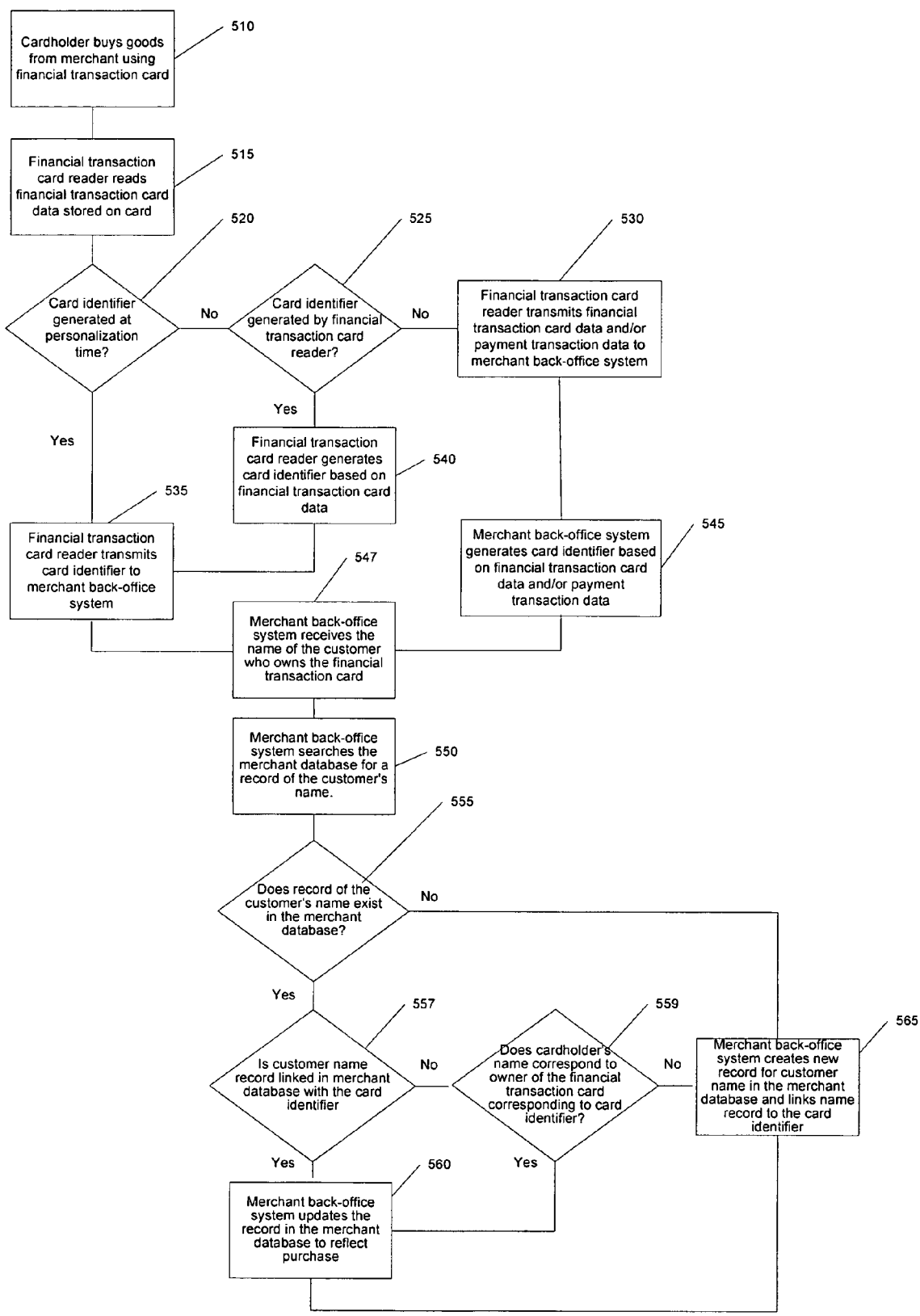
FIG. 5 is a flowchart depicting steps of a method for storing card identifiers based on customer name.

FIG. 5 is a flowchart depicting steps of a method for storing card identifiers based on customer name, in accordance with an exemplary embodiment of the present invention. Steps 510 through 545 are identical to steps 410 through 445, described supra.

At step 547, the merchant back-office system 330 receives the name of the customer who owns the financial transaction card 310. At step 550, the merchant back-office system 330 searches the merchant database 340 for a record of the customer's name.

If at step 555 it is determined that a record of the customer's name exists in the merchant database 340, at step 557 the merchant back-office system 330 determines whether the record of the name is linked in the merchant database 340 with the card identifier. If so, at step 560 the merchant back-office system 330 updates the linked record in the merchant database 340 to reflect an additional purchase by the customer using the financial transaction card 310.

If at step 557 it is determined that the record of the cardholder's name exists in the merchant database 340, but has not been previously linked with the card identifier (which was received and/or generated by the merchant back-office system 330 at step 510 through 545), the merchant back-office system 330 determines at step 559 whether the existing instance of the cardholder's name in the merchant database 340 actually corresponds to owner of the financial transaction card 310 that has been uniquely identified using the card identifier. If so, the card identifier is linked to the existing customer name record in the merchant database 340, and at step 560 the merchant back-office system 330 updates the linked record in the merchant database 340 to reflect an additional purchase by the customer using the financial transaction card 310. If not, step 565, which is described below, is performed.

If at step 555 it is determined that a record of the customer's name does not already exist in the merchant database 340, at step 565 the merchant back-office system 330 creates a new record for the customer name in the merchant database 340, and links that new record to the card identifier that was previously generated or received by the merchant back-office system 330 in steps 510 through 545. Then, at step 560, the merchant back-office system 330 updates the merchant database 340 to reflect that a purchase was made using the financial transaction card 310.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A method for tracking a customer's purchasing behavior by a merchant, comprising:
   reading by the merchant of financial transaction card data stored on the customer's financial transaction card;
   encrypting by the merchant of the financial transaction card data using a one-way permutation function to derive a unique card identifier that remains the same for a plurality of transactions, wherein the derived unique card identifier for the customer's financial transaction card is collision free;
   storing by the merchant of the unique card identifier external to the customer's financial transaction card; and
   associating by the merchant of each purchase made using the customer's financial transaction card with the unique card identifier.

2. The method of claim 1 wherein the financial transaction card data includes the primary account number of the financial transaction card.

3. The method of claim 2 wherein the financial transaction card data further includes the cardholder's name and the expiration date of the financial transaction card.

4. The method of claim 1 wherein the one-way permutation function is based on the factorization of large integers.

5. The method of claim 1 wherein the one-way permutation function is based on discrete logarithms in integer groups.

6. The method of claim 1 wherein the one-way permutation function is based on discrete logarithms over elliptic curve groups.

7. The method of claim 1 wherein the unique card identifier is stored on the financial transaction card when the financial transaction card is first personalized for the customer.

8. The method of claim 1 wherein the unique card identifier is generated by the financial transaction card reader.

9. The method of claim 8 wherein the financial transaction card reader is a smart card reader.

10. The method of claim 1 wherein the unique card identifier is generated by the merchant back-office system.

11. The method of claim 1 further comprising associating a name of the customer with the card identifier.

12. A system for tracking by a merchant of a customer's purchase behavior, comprising:
   a financial transaction card reader that reads for the merchant financial transaction card data stored on the customer's financial transaction card;
   an encryption module at the merchant that encrypts the read financial transaction card data using a one-way permutation function to derive a unique card identifier that remains the same for a plurality of transactions, wherein the unique card identifier for the customer's financial transaction card is collision free;
   a data storage module at the merchant external to the customer's financial transaction card that stores the derived unique card identifier and further stores data by the merchant associating each purchase made using the customer's financial transaction card with the unique card identifier.

13. The system of claim 12 wherein the financial transaction card data includes the primary account number of the financial transaction card.

14. The system of claim 13 wherein the financial transaction card data further includes the cardholder's name and the expiration date of the financial transaction card.

15. The system of claim 12 wherein the one-way permutation function is based on the factorization of large integers.

16. The system of claim 12 wherein the one-way permutation function is based on discrete logarithms in integer groups.

17. The system of claim 12 wherein the one-way permutation function is based on discrete logarithms over elliptic curve groups.

18. The system of claim 12 wherein the unique card identifier is stored on the financial transaction card when the financial transaction card is first personalized for the customer.

19. The system of claim 12 wherein the unique card identifier is generated by the financial transaction card reader.

20. The system of claim 12 wherein the financial transaction card reader is a smart card reader.

21. The system of claim 12 wherein the unique card identifier is generated by the merchant back-office system.

22. The system of claim 12 wherein the data storage module further associates a name of the customer with the card identifier.

* * * * *